US010171980B2

(12) United States Patent
Friesen

(10) Patent No.: US 10,171,980 B2
(45) Date of Patent: Jan. 1, 2019

(54) SYSTEMS AND METHODS FOR EMERGENCY RESPONSE DISPATCH

(71) Applicant: Jason Friesen, Norwalk, CT (US)

(72) Inventor: Jason Friesen, Norwalk, CT (US)

(*) Notice: Subject to any disclaimer, the term of this patent is extended or adjusted under 35 U.S.C. 154(b) by 53 days.

(21) Appl. No.: 14/680,199

(22) Filed: Apr. 7, 2015

(65) Prior Publication Data
US 2015/0289122 A1 Oct. 8, 2015

Related U.S. Application Data

(60) Provisional application No. 61/976,868, filed on Apr. 8, 2014.

(51) Int. Cl.
*H04W 4/90* (2018.01)
*H04W 4/02* (2018.01)

(52) U.S. Cl.
CPC .............. *H04W 4/90* (2018.02); *H04W 4/02* (2013.01)

(58) Field of Classification Search
CPC ........... H04W 4/02; H04W 4/90; H04W 4/22; H04W 64/00; G08B 25/00; G08B 1/00; G06F 19/00; G06Q 10/00; G06Q 50/00
See application file for complete search history.

(56) References Cited

U.S. PATENT DOCUMENTS

| | | | |
|---|---|---|---|
| 9,767,677 B1 * | 9/2017 | Paulin | G08B 27/001 |
| 2005/0164673 A1 * | 7/2005 | Ehlers | G08G 1/096811 |
| | | | 455/404.1 |
| 2005/0245232 A1 | 11/2005 | Jakober et al. | |
| 2006/0068753 A1 * | 3/2006 | Karpen | H04M 3/42 |
| | | | 455/404.2 |
| 2007/0103294 A1 | 5/2007 | Bonecutter et al. | |
| 2007/0218869 A1 * | 9/2007 | Thijs | G08B 25/016 |
| | | | 455/404.2 |
| 2008/0175356 A1 * | 7/2008 | Seidberg | G08B 25/08 |
| | | | 379/45 |
| 2009/0054029 A1 | 2/2009 | Hogberg et al. | |
| 2009/0125332 A1 * | 5/2009 | Martin | G06Q 10/00 |
| | | | 705/3 |
| 2009/0284348 A1 * | 11/2009 | Pfeffer | G08B 25/006 |
| | | | 340/7.3 |

(Continued)

OTHER PUBLICATIONS

International Search Report dated Jul. 8, 2015 in International Application No. PCT/US2015/024834.

*Primary Examiner* — Brandon J Miller
(74) *Attorney, Agent, or Firm* — Baker Botts L.L.P.

(57) ABSTRACT

Computerized method for coordinating decentralized response to emergency events includes receiving at least one request for emergency assistance, alerting registered responders in a geographic area corresponding to an emergency site of said request for emergency assistance, acknowledging a response from at least one of the responders agreeing to dispatch to the emergency site. The computerized method can also include one or more of confirming arrival of said at least one responder at the emergency site, determining a need for additional resources, confirming transportation to a destination facility, confirming arrival of said at least one responder at the destination facility, receiving a summary report of actions undertaken, and/or recognition of said at least one responder by the system to be available to receive subsequent requests for emergency assistance.

26 Claims, 14 Drawing Sheets

(56) References Cited

U.S. PATENT DOCUMENTS

| | | | |
|---|---|---|---|
| 2010/0153002 A1* | 6/2010 | Lee | G08G 1/087 |
| | | | 701/533 |
| 2010/0158202 A1 | 6/2010 | Johnson et al. | |
| 2011/0071880 A1 | 3/2011 | Spector | |
| 2011/0281547 A1* | 11/2011 | Cordero | G08B 27/001 |
| | | | 455/404.1 |
| 2012/0028600 A1* | 2/2012 | Vallaire | G08B 27/00 |
| | | | 455/404.2 |
| 2013/0073302 A1* | 3/2013 | Ryan | G06Q 50/22 |
| | | | 705/2 |
| 2013/0246960 A1 | 9/2013 | Saylors | |
| 2014/0114692 A1* | 4/2014 | Pearce | G06Q 40/08 |
| | | | 705/4 |

\* cited by examiner

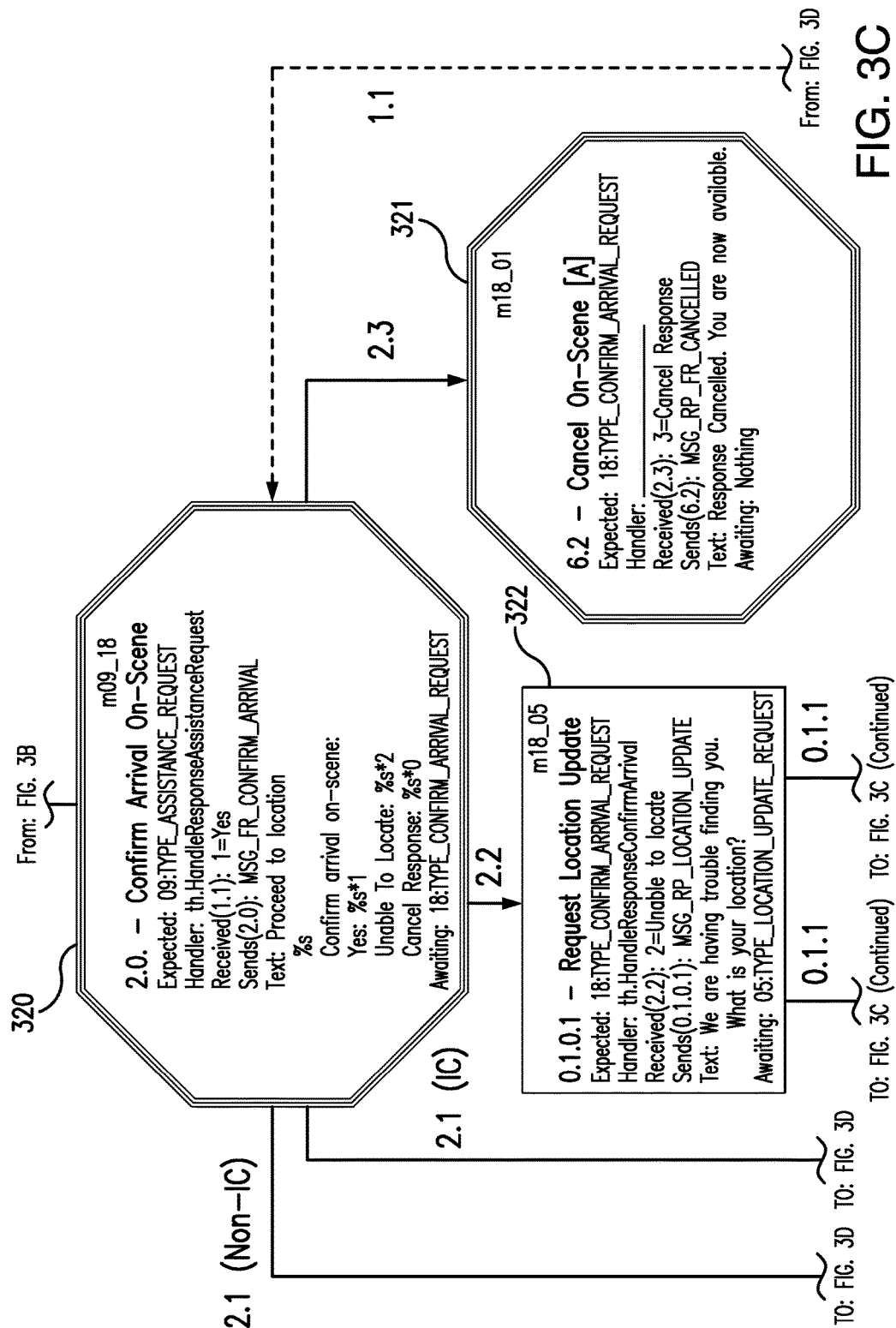

SYSTEMS AND METHODS FOR EMERGENCY RESPONSE DISPATCH

CROSS-REFERENCE TO RELATED APPLICATIONS

This application claims priority to U.S. Provisional Patent Application No. 61/976,868, filed Apr. 8, 2014, which is incorporated by reference herein in its entirety.

BACKGROUND

The disclosed subject matter is generally related to devices, systems and methods for emergency response dispatch, including systems and methods for implementing and facilitating emergency response dispatch utilizing mobile telecommunications infrastructure.

Emergency response systems can reduce or prevent premature death and disability due to emergency events by improving access to first responders and reducing delays in emergency transport for people in need of assistance. Emergency response systems can be delivered, for example, through conventional ambulance and emergency medical services (EMS) systems. However, such emergency response systems can be limited or unavailable in certain areas, for example in rural areas, as well as in developing countries, at least in part because of limited emergency resources or because the telecommunications infrastructure utilized for dispatching first responders may not be sufficiently established. Without such infrastructure, directing emergency resources to timely reach people requesting assistance when emergency events occur can be difficult.

Emergency response dispatching systems can connect people in need with appropriate first responders to facilitate timely dispatch of emergency response to emergency events. For example, in most areas of the U.S., people in need of emergency assistance can use the well-known 9-1-1 access code to alert first responders. However, capital investments and recurring costs needed to build and sustain such emergency telecommunications technologies in certain areas, for example in rural areas, as well as in developing countries can be cost prohibitive, which may delay or limit such initiatives. Additional factors, including poorly-maintained or non-existent public infrastructure, limited availability of GPS devices, inadequate maps, low literacy levels, among other factors, can provide additional challenges to implementing emergency response systems.

As such, death and disability from emergency conditions—including, for example and without limitation, conditions arising from road traffic injuries, complicated childbirth, among other emergencies—continue to challenge efforts in certain areas to timely dispatch emergency responders where and when needed. There remains a need for emergency dispatch response systems to overcome these challenges that can be affordably deployed, for example with little or no additional infrastructure.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes techniques for coordinating decentralized response to emergency events. An exemplary technique includes receiving at least one request for emergency assistance, alerting registered responders in a geographic area corresponding to an emergency site of said request for emergency assistance, acknowledging a response from at least one of the responders agreeing to dispatch to the emergency site, and confirming arrival of said at least one responder at the emergency site.

Additionally, and as embodied herein, exemplary techniques can include receiving a request for additional resources from the at least one responder, notifying at least one additional responder in the geographic area of the request for additional resources, obtaining a response from the at least one additional responder agreeing to dispatch to the emergency site, attaining confirmation of the arrival of the at least one additional responder at the emergency site, confirming a transportation status and a destination facility from the emergency site, confirming arrival of the emergency transportation at the destination facility, and confirming availability of the at least one responder. Additionally or alternatively, and as embodied herein, exemplary techniques can include determining a threshold number of resources to respond to the at least one request, and allocating a number of the responders not to exceed the threshold number of resources.

Furthermore, and as embodied herein, exemplary techniques can include providing a summary report of response times to the at least one responder. Confirming arrival of said at least one responder can include receiving updated location information of the emergency site from a reporting party or said at least one responder at the emergency site. Exemplary techniques can include storing location information of the emergency site, and producing reports and statistics based on the location information.

In addition, and as embodied herein, exemplary techniques can include recording and storing communications between reporting parties, responders, and receiving facilities for tracking. Exemplary techniques can include determining a response time of the at least one responder and storing the at least one response time. Exemplary techniques can include determining a suitable level of support for the request for emergency assistance. Exemplary techniques can include canceling previously sent requests to responders when the suitable level of support has been confirmed.

The disclosed subject matter also includes a system for coordinating decentralized response to emergency events having some or all of the features described herein. As recognized in the art, exemplary system disclosed herein can include some or all of the features described herein, or any suitable combination thereof.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

DETAILED DESCRIPTION

Figure 1:
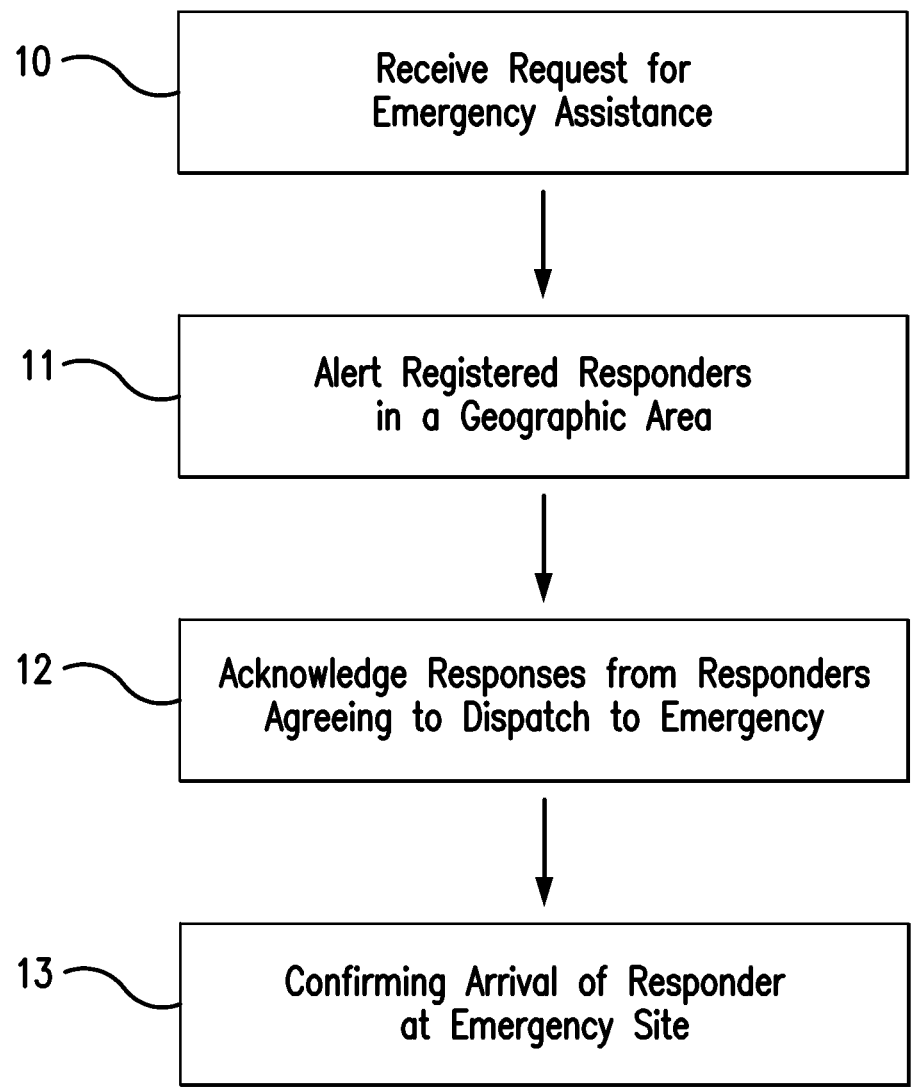
FIG. 1 is a flow diagram illustrating exemplary techniques for coordinating decentralized response to emergency events.

Reference will now be made in detail to the various exemplary embodiments of the disclosed subject matter, exemplary embodiments of which are illustrated in the accompanying drawings. The structure and corresponding method of operation of the disclosed subject matter will be described in conjunction with the detailed description of the system.

In accordance with the disclosed subject matter herein, a computerized method for coordinating decentralized response to emergency events is provided. The computerized method generally includes coordinating decentralized response to emergency events, receiving at least one request for emergency assistance, alerting registered responders, including layperson and/or trained responders, in a geographic catchment area corresponding to an emergency site of said request for emergency assistance, acknowledging a response from at least one of the responders agreeing to dispatch to the emergency site, and confirming arrival of said at least one responder at the emergency site.

The accompanying figures, where like reference numerals refer to identical or functionally similar elements throughout the separate views, serve to further illustrate various embodiments and to explain various principles and advantages all in accordance with the disclosed subject matter. For purpose of explanation and illustration, and not limitation, exemplary embodiments of systems and methods for emergency response dispatch in accordance with the disclosed subject matter are shown in FIGS. 1-5. While the present disclosed subject matter is described with respect to using the systems and methods for dispatch of emergency medical services, one skilled in the art will recognize that the disclosed subject matter is not limited to the illustrative embodiment. The systems and methods for emergency response dispatch can be applied, for example, to police and fire response, flood or other natural disaster response, crowd control, and any other applications suitable to utilize resource dispatching on demand. Furthermore, automated, decentralized emergency dispatch systems as described herein can be utilized to augment existing emergency response services, for example when existing services have limited range or are overwhelmed by demand.

Figure 2:
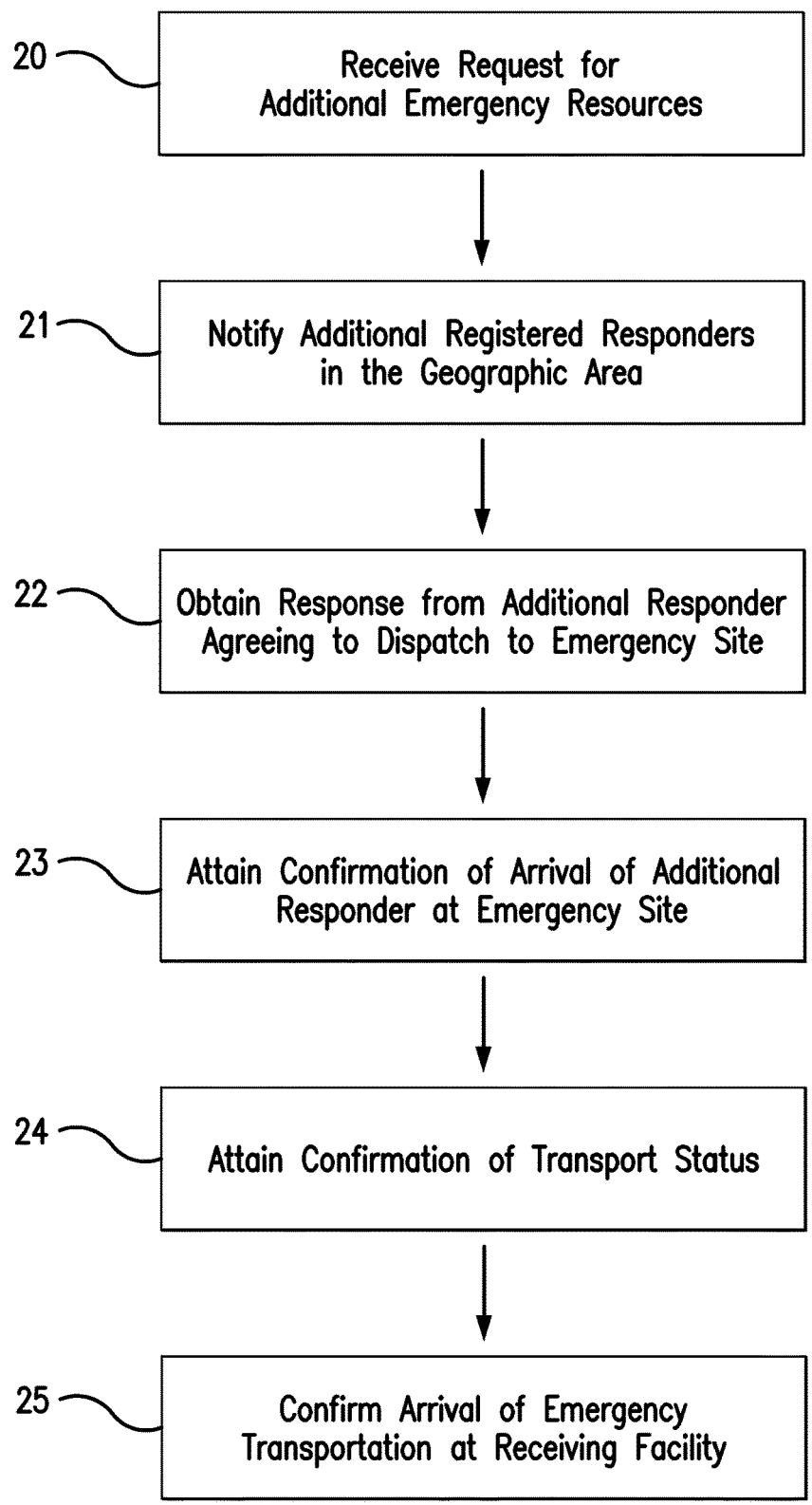
FIG. 2 is a flow diagram illustrating exemplary techniques for coordinating decentralized response to emergency events.

FIGS. 1-3 are diagrams illustrating exemplary embodiments of the disclosed subject matter. With reference to FIG. 1, at 10, a request for emergency assistance can be received, for example via text message, voice call, or smartphone application. With reference to FIG. 3A, as embodied herein at 302, the request can be received directly by the system from the requestor, for example by processing a text message request for assistance and/or receiving location data from smartphone application or a GPS-enabled device. Alternatively, the request can be received by an operator, for example by voice or text message, who can input the request into the system.

A Reporting Party (RP) contacts system-dispatch, alerting the need for assistance; system-dispatch collects location and other identifiers through verbal or digital communication; when received, system-dispatch relays a Request for Assistance and appropriate information to First Responders marked as "Logged-In" or recognized by the system as "Available" in a given geographic region, providing pertinent information to First Responders and requesting the First Responders to Confirm Response, including estimated time of arrival in minutes. Alternatively, the First Responders can Deny Response, thus indicating that the First Responder is unable or unwilling to provide assistance. The system can wait for the reply from First Responders, and can confirm to the Reporting Party that the system is Contacting Assistance, which can be performed, for example and without limitation, by voice message, text message, or any other suitable messaging technique.

A plurality of Requesting Parties can request emergency assistance from one or more locations simultaneously. The system can accept all such requests, track each request, and organize and store data pertaining to each request. For example, each request can be assigned a unique name or other suitable identifier. Furthermore, each communication pertaining to a particular request can be grouped together, for example in a threaded grouping of messages. The data can be stored, for example for subsequent review, analysis, and/or reporting. As embodied herein, the system can generate reports on various statistical data and/or metrics, for example and without limitation, providing statistical data, including averages and totals as applicable, regarding response times, transport times, number of requests for assistance received, availability of resources, geographic location of requests, or any other statistical data suitable to be stored and analyzed by the system.

Figure 3A:
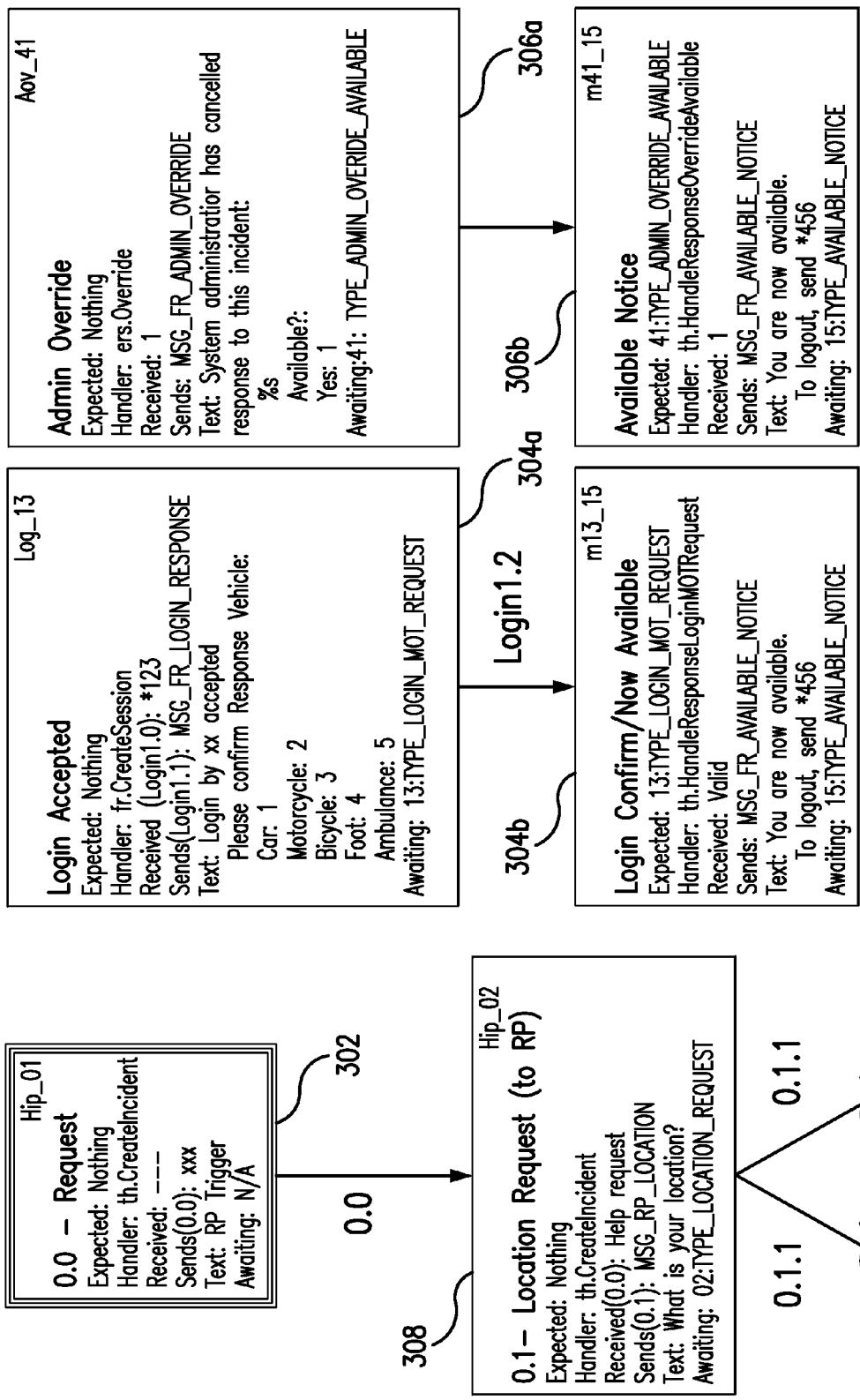
FIGS. 3A-3H together are a flow diagram illustrating exemplary techniques for coordinating decentralized response to emergency events.

With reference to FIG. 3A, First Responders can log in to the system via the "Login" modules 304. For example and as embodied herein, at 304*a*, a First Responder can notify the system that he or she is available to respond to requests for assistance and provide information related to his or her mode of transportation, including and without limitation, identifying that they are operating using, for example, a car, a motorcycle, a bicycle, an ambulance, and/or pedestrian transportation. Furthermore, and as embodied herein, a First Responder can specify additional details of resources or services that can be provided. For example and without limitation, a First Responder can indicate access to or availability of basic or advanced life support systems or other resources, such as rope rescue, extrication, or any other suitable resources. For example and as embodied herein, at 304*b*, the system can acknowledge the availability of the First Responder by sending a message to the First Responder that their status is now available.

Furthermore, and as embodied herein, at 306*a* the system can include an override function to allow the system to send out requests in certain situations, for example when all First Responders are logged out, all First Responders who are logged in are currently engaged in another incident, or it is determined that one or more First Responders currently engaged in another incident should be diverted to a different incident. For example and as embodied herein, in response to an override canceling one or more First Responders dispatch in an incident, at 306*b*, the one or more First Responders can respond to indicate availability for a further incident, such as by texting "1" or "Yes" to the system. Additionally or alternatively, First Responders can log out, for example by sending a predetermined alphanumeric code to the system, and in response the system can indicate that the First Responder is no longer available to respond to requests for assistance. The system can send a confirmation message to the First Responder, and can avoid sending further messages to the logged out First Responder until the First Responder has logged in again.

Referring still to FIG. 3A, at 308, the system can request the location of a Reporting Party requesting emergency assistance, to which the Reporting Party can respond with location information, for example and without limitation, via a text message, voice message, smartphone application, and/or GPS device. Such a Location Request can be made, periodically and/or after receiving a request for assistance, for example to update the system with new location coordinates. Furthermore, the system can determine when a single incident (e.g., a motor vehicle collision) has provoked more than one request from different parties, for example and without limitation, using GPS coordinates, triangulation, voice data, or text messages, and for example determining that a plurality of such messages specify the same or similar location. As a further alternative, a plurality of requests for assistance received within a predetermined time window can automatically trigger an alert to the system, which can prompt review of such requests by an operator or administrator.

Figure 3B:
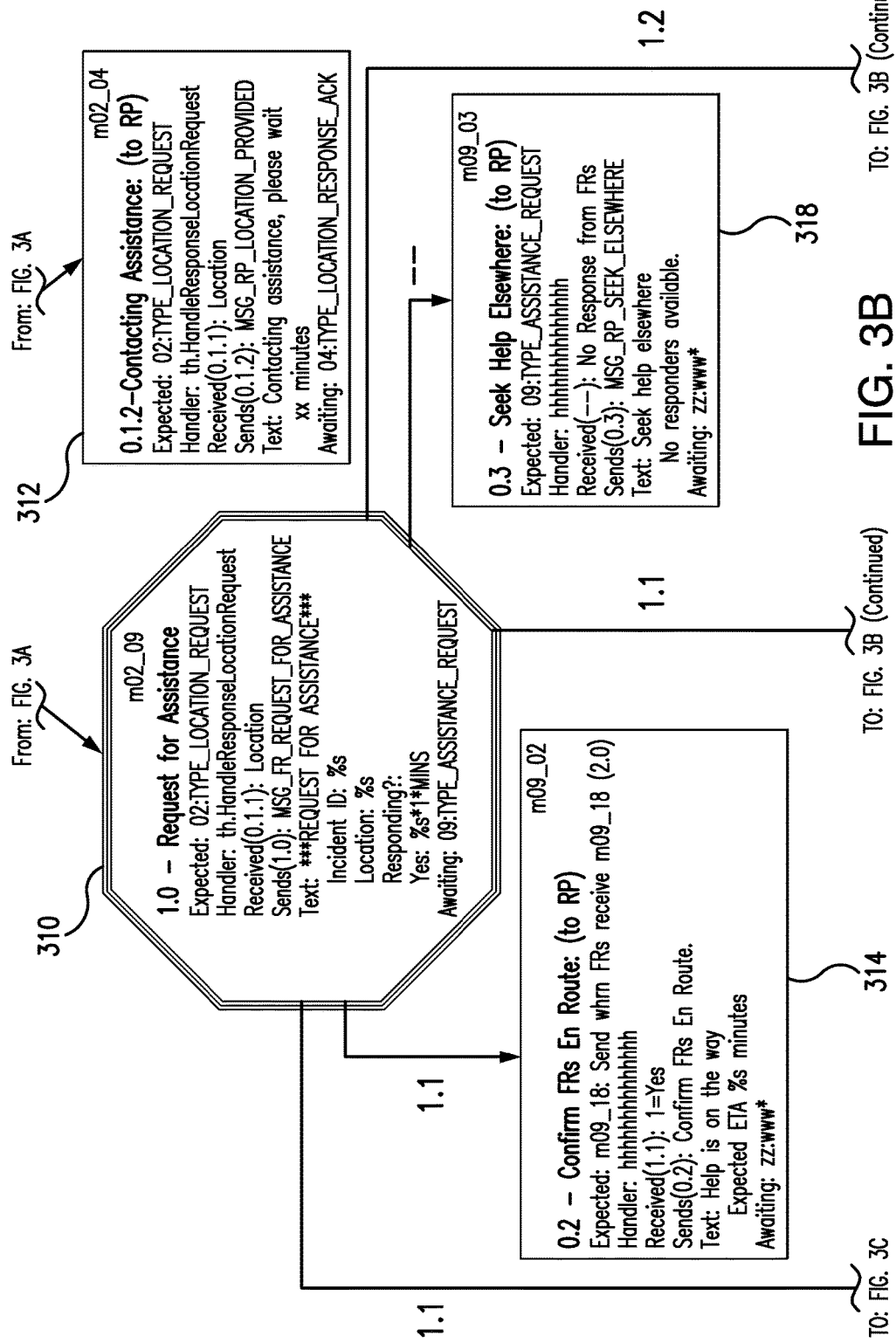
Figure 3B:
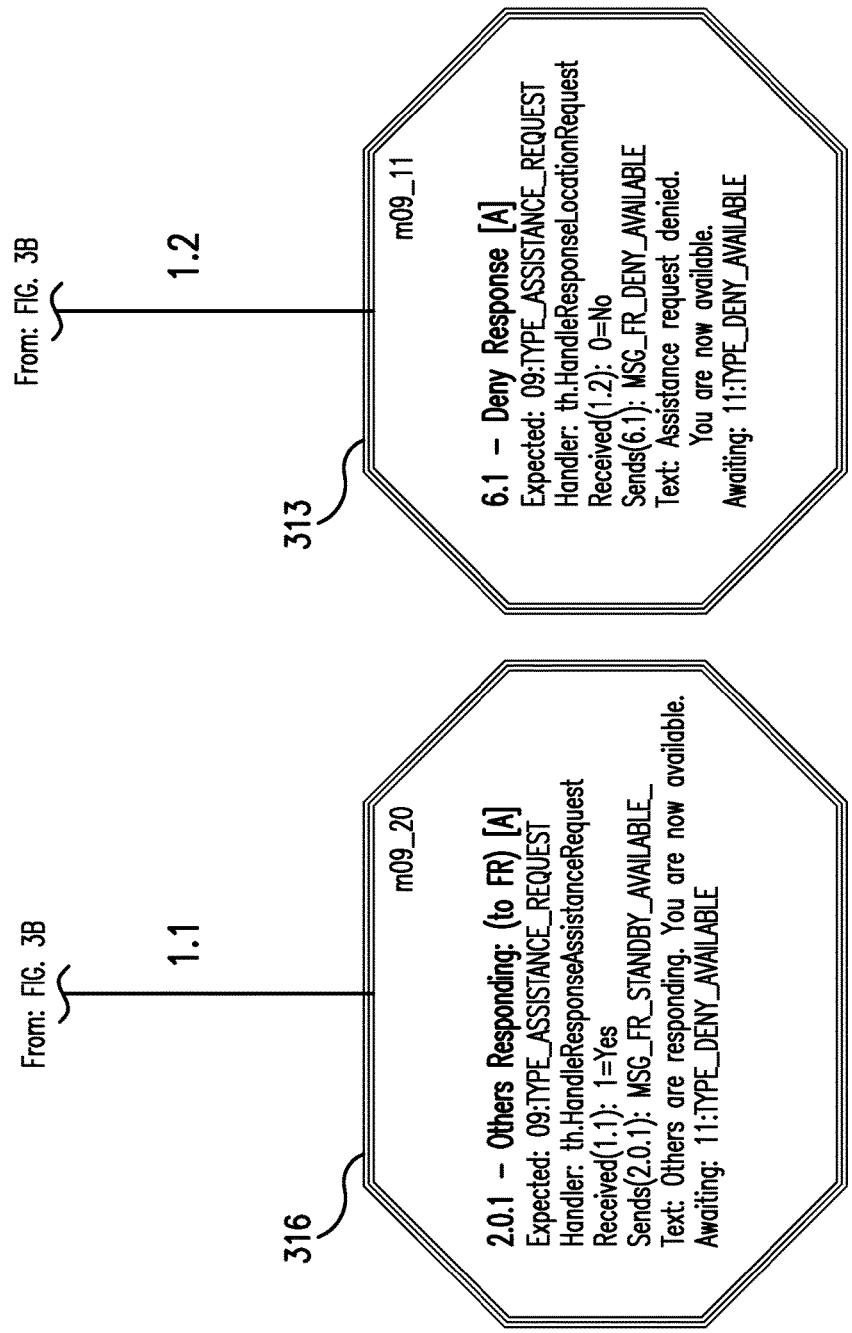

With reference to FIG. 1, at 11, the system can alert one or more registered First Responders in the geographic catchment area. With reference to FIG. 3B, for example and as embodied herein, at 310, the system can send a Request for Assistance to the one or more registered First Responders in a geographic catchment area corresponding to the Location provided by the Reporting Party. For purpose of illustration and not limitation, as embodied herein, the Request for Assistance can include a text alert that the message is a "REQUEST FOR ASSISTANCE," can include an Incident ID # corresponding to the Request, can include the Location information received from the Reporting Party, and can include a prompt for the First Responder to indicate whether the First Responder is responding to the Request. For example and as embodied herein, the First Responder can indicate the First Responder is responding, such as by texting "1" or "Yes," and can include a number of minutes for the First Responder to arrive at the reported Location. Additionally, and as embodied herein, at 312, the system can indicate to the Reporting Party that the system is Contacting Assistance, for example by sending a message "Contacting assistance, please wait ## minutes" (where "##" can refer to a number of minutes that the system will await confirmation from one or more First Responders to the Request for Assistance). Alternatively, and as embodied herein, at 313, a First Responder can decline a Request for Assistance, such as by texting "0" or "No" to the system, or by not making any reply to the Request.

With reference to FIG. 1, responses from First Responders who agree to dispatch to the emergency site are acknowledged at 12. With reference to FIG. 3B, for purpose of illustration and not limitation, and as embodied herein, at 314, the system can confirm to the Reporting Party that one or more First Responders is en route to the reported Location. For example and as embodied herein, the system can send a message to the Reporting Party that "Help is on the way," and can indicate to the Reporting Party an expected number of minutes for one or more of the First Responders to arrive at the Location.

The system can utilize an adjustable algorithm to set a threshold for the number and type of resources requested. In this manner, a suitable number of First Responders can be allocated to an emergency event, and thereby can avoid, for example, too many First Responders responding to a minor incident, or too few First Responders at the scene of a complex incident. For example and without limitation, and as embodied here, an incident can have a predetermined default limit on the number of confirmed First Responders to an incident, e.g., four, and a minimum number of transport vehicles, e.g., one, Alternatively, the limit or threshold can be customized according to the expected resource demands estimated from the underlying incident, either by the automated system using, for example and without limitation, a keyword or predetermined alphanumeric code. Additionally or alternatively, the limit or threshold can be customized manually by a system operator. As such, and as embodied herein, at 316, if a number of First Responders indicating availability to respond to the Request exceeds a threshold, the system can indicate to the excess First Responders that "Others are responding," and can indicate that the excess First Responders are "Available" to respond to other Requests for Assistance. As a further alternative, as embodied herein, at 318, if no First Responders respond to the Request for Assistance after a predetermined amount of time, the system, automatically and/or upon instruction from a system operator, can indicate to the Reporting Party that "No responders are available."

Additionally or alternatively, the system can utilize specified waiting periods (called "chute times") to receive confirmation from a First Responder. Such chute times can refer to an allowed amount of time for a responder to prepare for and proceed en route to respond to an emergency event. The system can utilize an adjustable algorithm to set acceptable limits on chute times. When the chute time limit is exceeded, First Responders who do not meet the threshold for requested resources and/or have not confirmed or denied their response in reply to the original Request for Assistance, as described herein, can be canceled from the event and marked as available to respond to another request for assistance, as described herein. When a response is given within the time limit, the response can be matched against other resource allocation criteria mentioned above. If the First Responder is accepted, the system can send a confirmation to the First Responder to proceed to the site, as described herein. If the First Responder is rejected, the system can inform the First Responder that he or she is not needed and can be marked as available to respond to further requests, as described herein.

The system can utilize time estimates manually provided by the First Responder and/or calculated by the system to determine which First Responders are most suitable to respond to the incident and which First Responders are not needed to respond. For example, a First Responder ten minutes away from the scene of an incident can be selected, while a First Responder twenty minutes away can be denied. The system can also consider and provide a suitable type or number of transportation options. For example. a First Responder on foot can be denied, while a First Responder in a vehicle can be accepted, for example if it is determined that vehicle transportation is required. As a further alternative, the system can triage all First Responders according to their availability, the number of First Responders needed or requested, their proximity, and the resources they can provide. Cross-checking these variables against the threshold criteria, the system can dispatch the closest and most appropriate resources to each scene.

Additionally or alternatively, the system can utilize an administrator or operator to input the location and initiate the response, which can be beneficial where location descriptions, e.g., physical addresses, are inconsistent or not available. The administrator or operator can also intervene in or alter system decisions, such as by manually allocating or reallocating resources from one incident to another as beneficial or necessary.

Figure 3C:
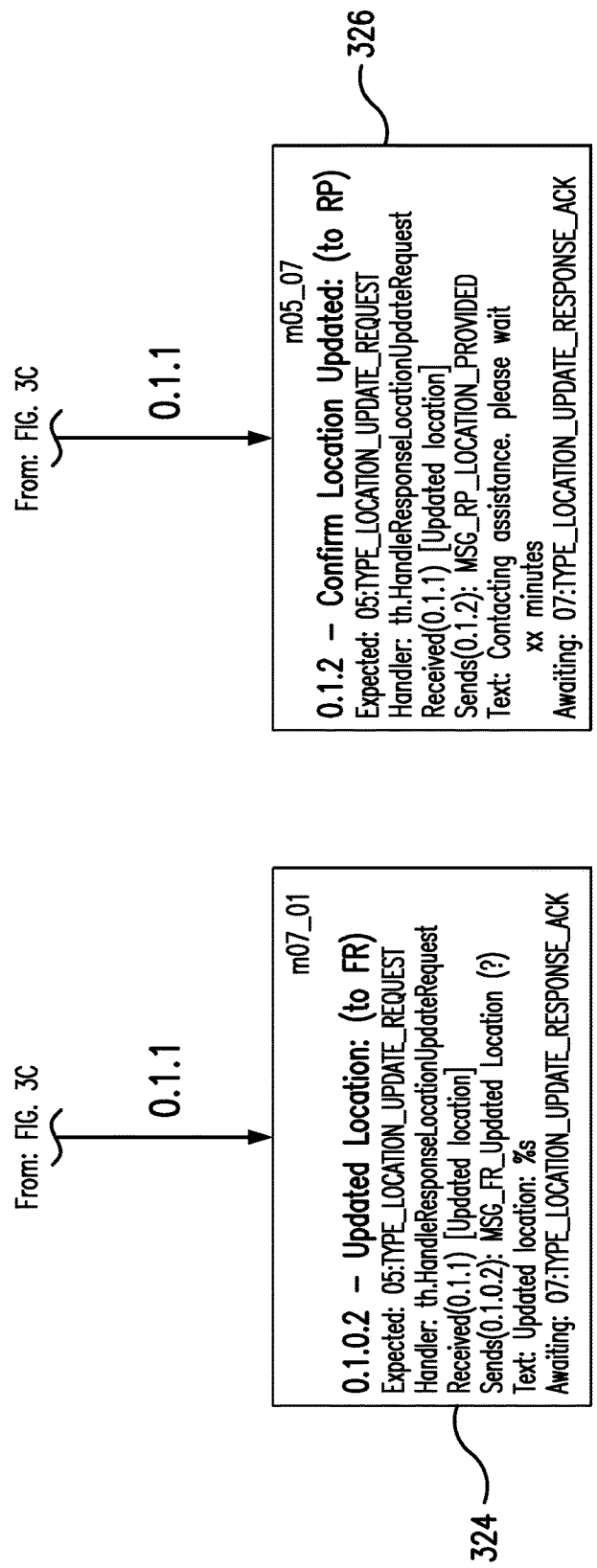
Figure 3D:
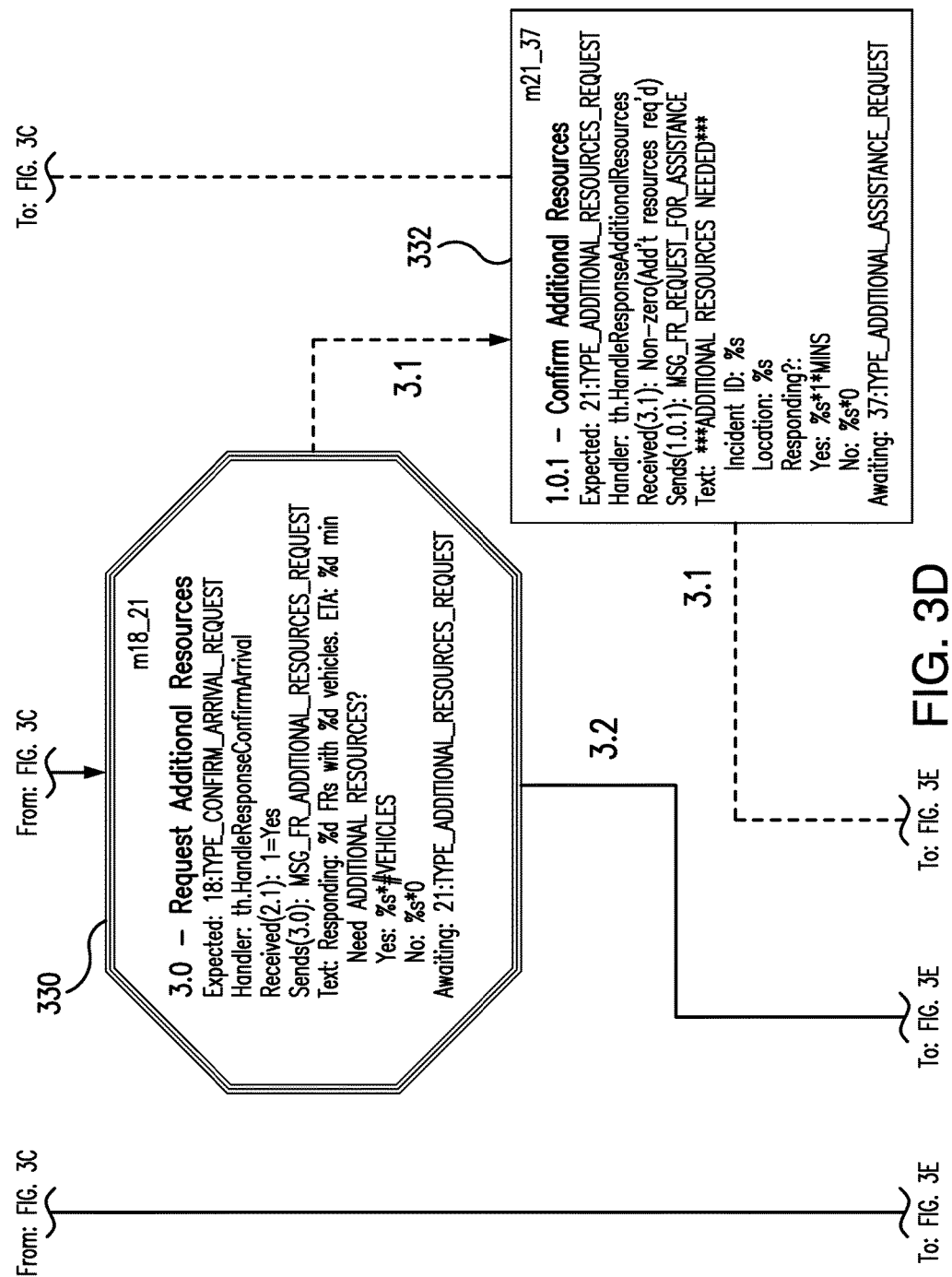

With reference to FIG. 1 at 13, the system can confirm arrival of at least one First Responder at the requested Location. Referring now to FIG. 3C, for example and as embodied herein, at 320, the one or more First Responders agreeing to dispatch to the requested Location can receive a prompt from the system to Confirm Arrival On-Scene. For purpose of illustration and not limitation, as embodied herein, the one or more First Responders can confirm arrival by sending a message of "1" or "Yes" to the system. Alternatively, the one or more First Responders can indicate they are unable to locate the requested Location or the Reporting Party, e.g., by sending a message of "2" or "Unable to locate" to the system. As a further alternative, the one or more First Responders can indicate that they have canceled responding to the Request, e.g., by sending a message of "0" or "Cancel" to the system. As such, at 321, the system can confirm with the one or more canceling First Responders that they have canceled and/or that they are now available to respond to other Requests. In some cases, a request for emergency assistance may not require a response by a First Responder. For example, the incident can resolve itself, or other extenuating circumstances can make a response unnecessary. Furthermore, a Reporting Party can determine no assistance is needed upon arrival of a First Responder. The system can thus allow a First Responder to cancel their individual involvement, and/or the entire incident and thus other First Responders' involvement, additionally or alternatively, at 321.

Referring still to FIG. 3C, at 322 the system can Request a Location Update from the Reporting Party. For purpose of illustration and not limitation, as embodied herein, a location provided to the First Responder can be inaccurate, or can change after the initial request for assistance is made. As such, the First Responder can inform the system that the incident and/or Reporting Party cannot be located, thereby prompting the system to communicate with the Reporting Party to obtain an updated location and relay the updated location to the First Responders. For example, a Location Request can be sent to the Reporting Party in the form of a text message, such as "What is your location?" The Reporting Party can respond with an updated location, which can be relayed via text message at 324 to the First Responders. As an alternative, a human operator can place a telephone call to the Reporting Party to receive the location information verbally and input the location information into the system to be transmitted to the First Responders. As a further alternative, the system can utilize GPS tracking or other suitable geo-location techniques, as available. In some embodiments, the Reporting Party's location can appear, and can be updated automatically, directly on the First Responder's mobile device. At 326, the system can send a message to the Reporting Party confirming that the location has been updated, and can indicate to the Reporting Party that the updated location is being communicated to the one or more First Responders.

With reference to FIG. 2, at 20, the system can receive a request for additional emergency resources, for example and without limitation additional First Responders, transportation, or other resources, from a First Responder at the emergency site. For purpose of illustration and not limitation, as embodied herein, an initial First Responder can arrive first to the requested location, and the system can inform the initial First Responder, for example and without limitation, of a number of other First Responders en route, the expected time of their arrival, and the type of transportation provided by these First Responders. Additionally or alternatively, referring now to FIG. 3D, the system can designate the initial First Responder as Incident Commander, and can allow the Incident Commander to request a number, type and kind of additional resources suitable to resolve the emergency at 330. For purpose of illustration and not limitation, as embodied herein, the system can prompt the Incident Commander to indicate whether there is a need for additional resources. The Incident Commander can send a message to the system indicating "Yes" and/or a number or kind of additional resources needed. For example, the Incident Commander can indicate a number of vehicles requested to the Location. Alternatively, the Incident Commander can send a message to the system indicating "No" or "0" additional resources are needed.

With reference to FIG. 2, at 21, the system can notify additional registered responders in the geographic area of the request for additional resources. For purpose of illustration and not limitation, with reference to FIG. 3D, at 332, if additional resources are needed, at 332, the system can send a Request for Additional Resources to the one or more registered First Responders in the geographic catchment area corresponding to the Location of the Incident Commander. For purpose of illustration and not limitation, as embodied herein, the Request for Additional Resources can include an alert of "ADDITIONAL RESOURCES NEEDED" can include the Incident ID # corresponding to the Request, can include the Location information of the Incident Commander, and can include a prompt for the First Responder to indicate whether the First Responder is responding to the Request.

Referring again to FIG. 2, the system can obtain responses from First Responders at 22 agreeing to dispatch to the emergency site. For example and as embodied herein, the First Responder can indicate the First Responder is responding, such as by texting "1" or "Yes," and can include a number of minutes for the First Responder to arrive at the reported Location. Alternatively, and as embodied herein, a First Responder can decline a Request for Additional Resources, such as by sending a message of "0" or "No" to the system. At 23, the system can obtain confirmation of the arrival of additional resources at the emergency site.

Figure 3E:
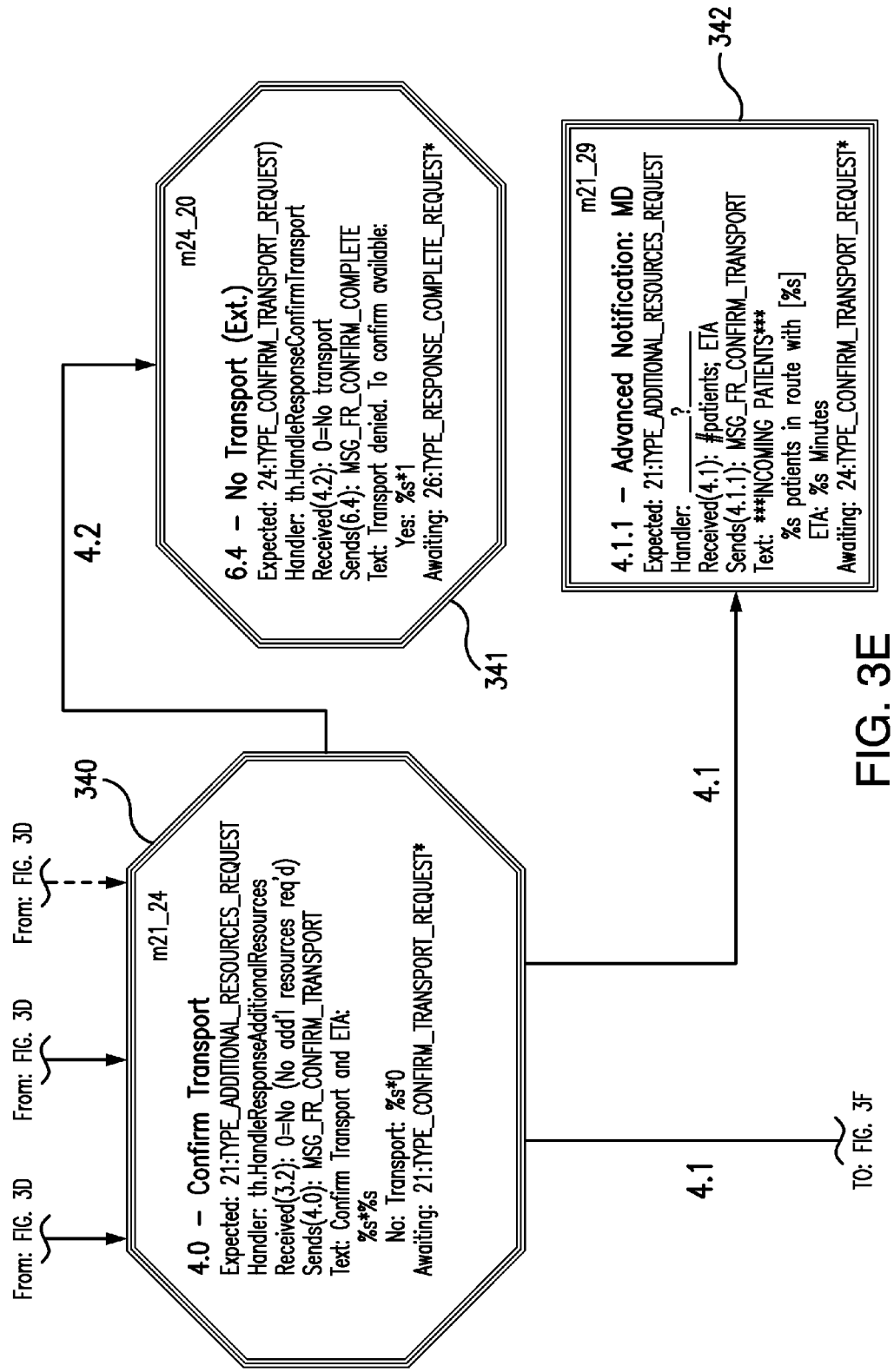

Referring still to FIG. 2, at 24, the system can obtain confirmation of transport status. With reference to FIG. 3E, for example and without limitation, as embodied herein, at 340, if the Incident Commander indicates no additional resources are needed, as discussed above, the system can request confirmation from the Incident Commander, or one or more other of the First Responders, if responding, that transportation is available or being initiated. For purpose of illustration and not limitation, as embodied herein, the system can send a message requesting the Incident Commander and/or one or more other First Responders to "Confirm Transport and ETA." The Incident Commander and/or one or more other First Responders can confirm transport by indicating a destination facility, the number of people being transported, and can indicate an estimated number of minutes to arrive at a destination facility. Although the destination facility is identified as a hospital in this embodiment, any suitable destination facility can be used. Additionally or alternatively, a plurality of destination options can be identified. The Incident Commander, one or more other First Responders and/or the system can indicate the target destination facility. Alternatively, the Incident Commander and/or one or more other First Responders can indicate no transportation is available or being initiated, such as by sending a message of "0" or "No." As such, at 341, the system can send a message to the Incident Commander and/or one or more other First Responders confirming "Transport [is] denied."

Figure 3F:
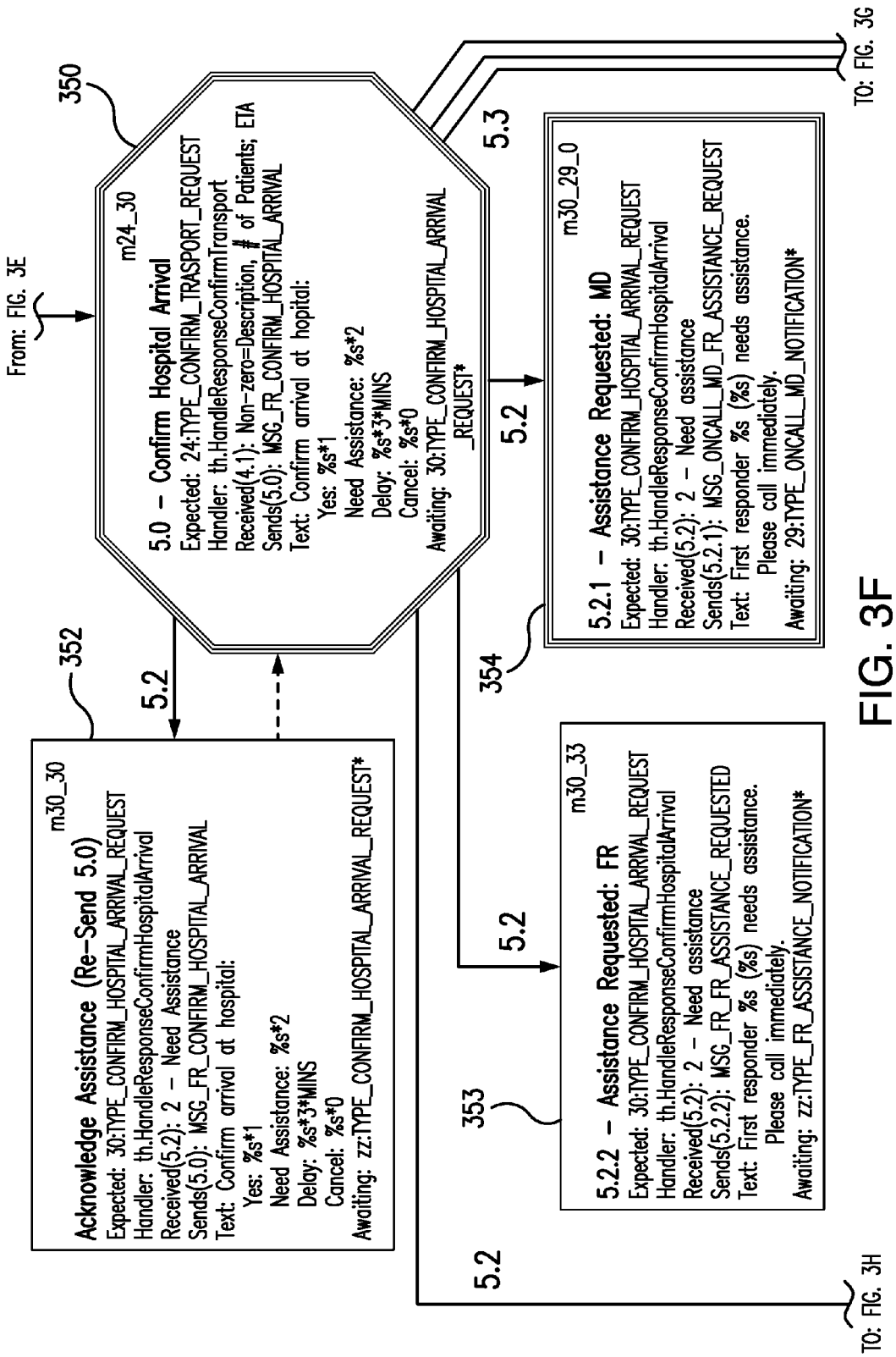

Referring still to FIG. 3E, at 342, as embodied herein, the system can provide advance notification to the destination facility to which the Incident Commander and/or one or more other First Responders has confirmed transport. For example and without limitation, as embodied herein, the system can send a message to the destination facility that a number of patients are en route to the destination facility, that a number of vehicles are en route to the destination facility, and/or an estimated number of minutes before arrival of the transportation to the destination facility. The message can also include any additional information relayed by the First Responder, for example and without limitation, a patient's vital signs or other pertinent medical information Referring now to FIG. 2, at 25, the system can confirm the arrival of the transportation at the destination facility. With reference to FIG. 3F, for purpose of illustration and not limitation, as embodied herein, at 350, the system can prompt the Incident Commander and/or one or more other First Responders to "Confirm arrival at hospital." For example and without limitation, the system can prompt the Incident Commander and/or one or more other First Responders to confirm arrival, such as by sending a message of "1" or "Yes," to indicate assistance is needed (e.g., if the individual being transported becomes combative or a higher level of care is needed), such as by sending a message of "2" or "Need assistance," to indicate a delay in transport (e.g., a mechanical failure or delay due to force majeure), such as by sending a message of "3" or "Delay" and indicating a number of minutes estimated to arrive or a number of minutes of delay, and can indicate transportation has been canceled, such as by sending a message of "0" or "Cancel."

Referring still to FIG. 3F, at 352, the system can acknowledge an indication from the Incident Commander and/or one or more other First Responders that assistance is needed. For purpose of illustration and not limitation, as embodied herein, the system can send a message to the Incident Commander and/or one or more other First Responders acknowledging that assistance is needed, and can send a new prompt to the Incident Commander and/or one or more other First Responders to confirm hospital arrival, as described above, for example after such additional assistance is rendered.

Additionally or alternatively, at 353, the system can notify the Incident Commander and/or one or more other First Responders that assistance is needed. For purpose of illustration and not limitation, as embodied herein, the system can send a message to the Incident Commander and/or one or more other First Responders, either previously responding to the Request or other First Responders in the geographical catchment area, indicating that the requesting Incident Commander or First Responder needs assistance. For example and as embodied herein, the system can send a message requesting that any available First Responder call the requesting First Responder to receive instructions to render immediate assistance.

In addition, or as a further alternative, at 354, the system can notify the destination facility that assistance is needed. For purpose of illustration and not limitation, as embodied herein, the system can send a message to the destination facility requesting that the destination facility call the requesting First Responder to receive instructions to render immediate assistance or provide online medical direction.

Figure 3G:
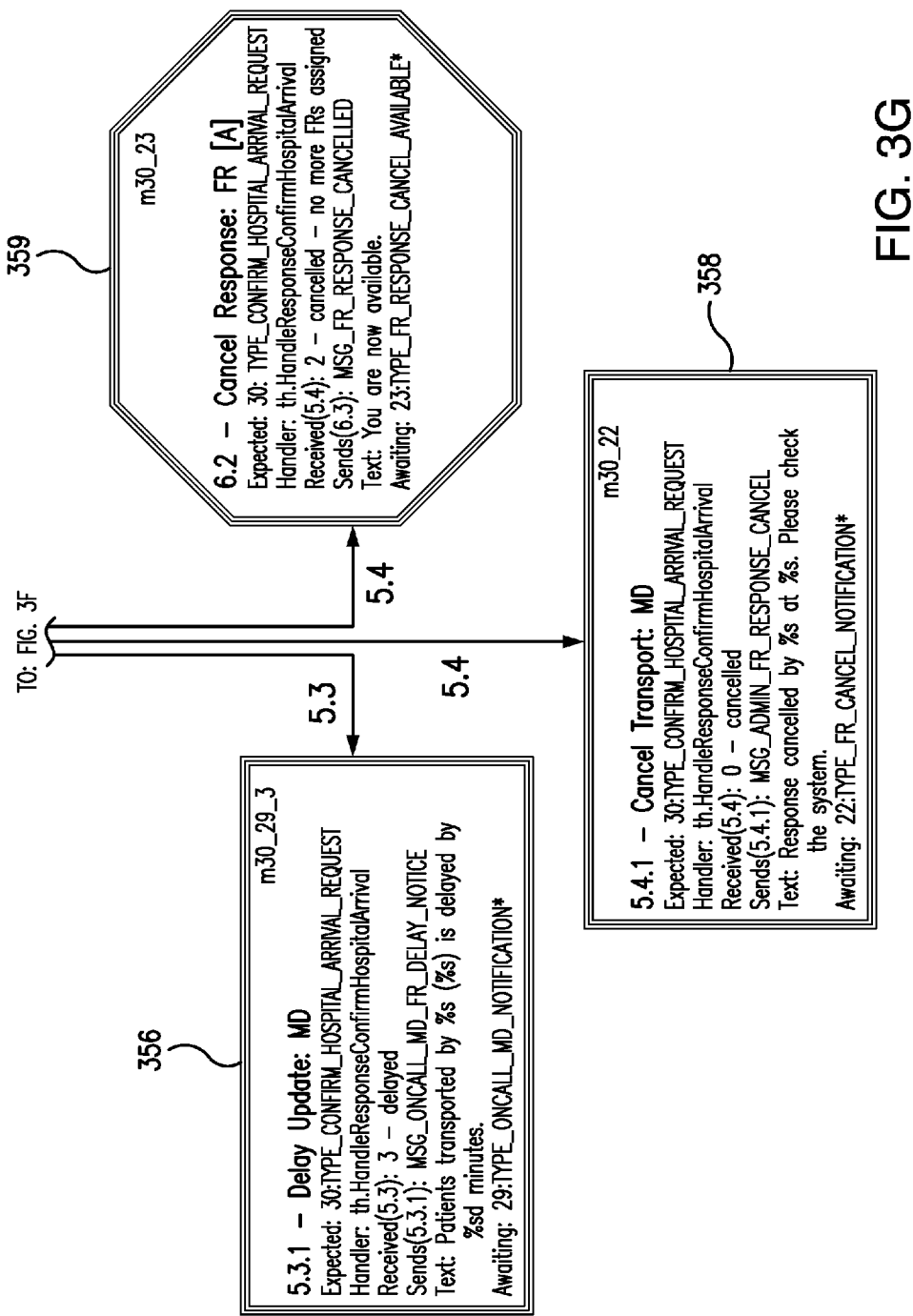
Figure 3H:
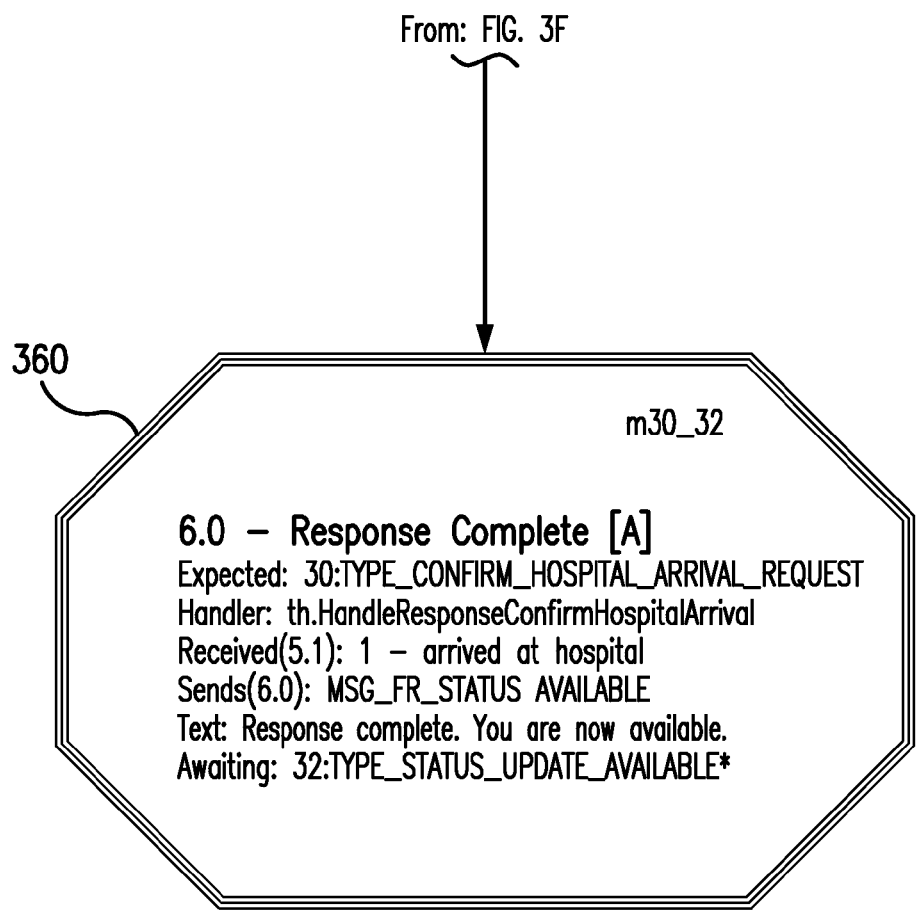

Referring now to FIG. 3G, for purpose of illustration and not limitation, as embodied herein, at 356, the system can send an indication to the destination facility, for example, when the Incident Commander and/or one or more other First Responders indicates a delay in transport, as described herein. For example and without limitation, as embodied herein, the system can send a message to the destination facility indicating a number of patients transported by the Incident Commander and/or one or more other First Responders will be delayed by a number of minutes, as indicated above by the Incident Commander and/or one or more other First Responders. Additionally or alternatively, in response to a notification regarding delay of resources, the system, receiving facility or other First Responders can contact the delayed resources to obtain updated information regarding the delay and/or can contact additional First Responders or resources to replace the delayed resources.

Alternatively, for purpose of illustration and not limitation, as embodied herein, at 358, the system can notify the destination facility that transportation has been canceled. For purpose of illustration and not limitation, as embodied herein, the Incident Commander and/or one or more other First Responders can inform the system that the emergency situation has ended or otherwise been resolved, as described herein. This can occur, for example, when a request for emergency assistance does not warrant transportation, such as when the Reporting Party opts to self-transport, or other circumstances make transport unnecessary or undesirable. The system can allow a First Responder to cancel transportation, thus ending the involvement of transportation in the incident and marking the transportation resource as "Available." For example, and as embodied herein, the system can send a cancellation via a text message or numerical code to the destination facility indicating that transportation of people by the Incident Commander and/or one or more other First Responders is canceled.

Additionally or alternatively, for purpose of illustration and not limitation, as embodied herein, at 359, the system can confirm with the Incident Commander and/or one or more other First Responders that transportation has been canceled. For example and without limitation, as embodied herein, the system can notify the Incident Commander and/or one or more other First Responders that they are available to respond to another Request for Assistance.

In addition or as a further alternative, as embodied herein, for purpose of illustration and not limitation, as embodied herein, at 360, the system can confirm with the Incident Commander and/or one or more other First Responders that the response is complete. For example and without limitation, and as embodied herein, when the Incident Commander and/or one or more other First Responders has confirmed arrival at the destination facility or has otherwise indicated that the request is resolved or completed, the system can notify the Incident Commander and/or one or more other First Responders that they are available to respond to another Request for Assistance.

In some embodiments, a summary report of response times can be provided to the First Responder. The summary report can summarize response times for certain actions during one or more previous requests for emergency assistance, for example arrival at the emergency site, arrival at an emergency facility, or any other actions performed. For example, and as embodied herein, a summary report can be provided to any First Responder that has agreed to respond to an emergency event, for example as at 12. Furthermore, and as embodied herein, a summary report can be provided if any actions are performed during response to a request, regardless if the response to the emergency event is completed by the First Responder. Alternatively, a summary report can be provided if certain actions are performed during response to a request, for example if the response to the emergency event is completed by the First Responder. For example, and as embodied herein, a First Responder can agree to respond to a request and provide transportation to an emergency facility. Upon confirmation of the First Responders availability following responding to the request and providing transportation, the system can provide response times for any actions performed by the First Responder. Alternatively, the First Responder can agree to respond to a request, and can later cancel the response, for example upon arrival to the scene of the emergency event. As such, the system can provide a summary report to the First Responder including only the actions performed, for example, the time of confirmation to respond to the event, the time of arrival to the scene of the emergency event, and the time at which the First Responder became available for response to a subsequent emergency event.

Furthermore, the system can coordinate all First Responders, as well as those who need to be transported to a receiving facility, for example and without limitation a hospital, as embodied herein by utilizing a multistep function to track several variables. For example and without limitation, and as embodied herein, the system can track the receiving facility, the number of individuals being transported, and the estimated time of arrival. Such variables can be conveyed to the system, for example and without limitation, using alphanumeric codes and/or numerical values, as described herein. As embodied herein, an alphanumeric code representing a receiving facility, along with the number of individuals being transported and the length of time estimated to arrival can each be entered as numerical values. For example and without limitation, to inform the system that First Responders are en route to a receiving facility represented as "1" to deliver one patient in an estimated time of fifteen minutes, the data can be input to the system in a single message separated by markers, for example as "1*1*15".

In some embodiments, a software system can form the core of emergency dispatching and response utility. The software program can operate on a personal computer with a USB modem or GSM modem and enabled with a SIM card, utilizing a unique number—e.g., "911"—which can serve as a universal public access number in a predetermined geographic area—i.e., the catchment area. A backup of the software program can also be maintained on a server. Another embodiment of the disclosed methods can be a software program that can be used on both feature phones and smartphones, with all the associated applications and features (e.g., GPS, touchscreen, icons).

Additionally or alternatively, as embodied herein, the emergency dispatch systems described herein can be integrated within existing dispatch systems to increase capacity and/or expand the area of coverage of such existing systems. For example, a universal emergency number can be utilized in a region to access an existing emergency dispatch system in a certain coverage area, for example in an urban center, and the system according to the disclosed subject matter can be configured to relay requests for assistance using the universal emergency number originating outside the coverage area to registered responders as described herein. Furthermore, and as embodied herein, the system can be configured to relay requests for assistance using the universal emergency number to registered responders as described herein when the capacity for the existing emergency dispatch system is exceeded.

The disclosed methods and systems can enable the alerting, dispatching and response necessary to provide emergency dispatching to multiple first responders simultaneously. In some embodiments, the system can be utilized by hospitals, EMS agencies, fire departments and other public and private emergency responder organizations and schemes. The system can track emergency incidents, including the location of and communications between reporting parties and eyewitnesses, responders, transportation, and receiving facilities. The system can relay communications and incident information between all parties, coordinate their response, and triage essential resources during large-scale and/or multiple concurrent incidents. In some embodiments, the system can use voice, text and/or digital information. Furthermore, and as embodied herein, the system can store any data and information related to requests for assistance and associated response, including response times, geographic locations, or any other suitable data, and can support real-time updates and a web-based interface. In some embodiments, the system can interface with other emergency 911 systems. Additionally or alternatively, the system can operate as an "over-the-top" system, for example operating as an alternative to text messaging or internet services provided by a mobile network operator.

Advantages of the disclosed subject matter include, without limitation, reduced delays in accessing emergency medical care and transport, reduced financial costs compared with conventional dispatching technologies and associated infrastructure, accessibility to populations with low literacy rates and limited education, utilization of readily-available resources such as mobile phones, USB modems, and laptops; ease of deployability with minimal centralized information technology requirements, adaptability to a variety of settings and deployment scenarios, including but not limited, cruise lines, train and trucking routes, mining, oil fields, concerts, parades, campuses, parks and multi-story buildings.

Whereas conventional systems can rely on a limited number of designated ambulances to provide response throughout a given geographic area, the systems and techniques of the disclosed subject matter can invert dispatching algorithms to effectively increase the number of available emergency transport vehicles within a community at any given time. As a result, for example and without limitation, instead of sending individual ambulances to seek out a patient and return with them to the hospital—much like a boomerang—the disclosed system can provide an extended range by alerting all First Responders in an area where emergency response is needed, and then coordinating the nearest available responders who can provide appropriate and safe transport. The systems and techniques of the disclosed subject matter can utilize existing mobile communication infrastructure, including and without limitation mobile messaging services, SMS gateways and/or mobile applications, to send out a telecommunication signal that all First Responders can see whenever an emergency occurs. As described herein, the systems and techniques can coordinate an emergency response by those First Responders who are able and most suitable to respond.

To account for low levels of literacy, the systems and techniques according to the disclosed subject matter can be both legible and flexible. Alphanumeric messages and/or mobile applications, for both text message capable phones and smartphones, as appropriate, can be written with a lowest-common-denominator approach, such that basic concepts can be communicated simply and effectively in any language, using any typeset or visual icons, to coordinate emergency response functions including, without limitation, Alert, Response, Arrival, Additional Resources, Transport, and Patient Turnover. Furthermore, the systems and techniques according to the disclosed subject matter can simultaneously initiate, process, and track any number of individual and grouped messages, including messages from individuals prone to human error. For example and as described herein, the systems and techniques can guide an emergency response from request to completion, while also accounting for a variety of factors inherent to emergency response.

Figure 4:
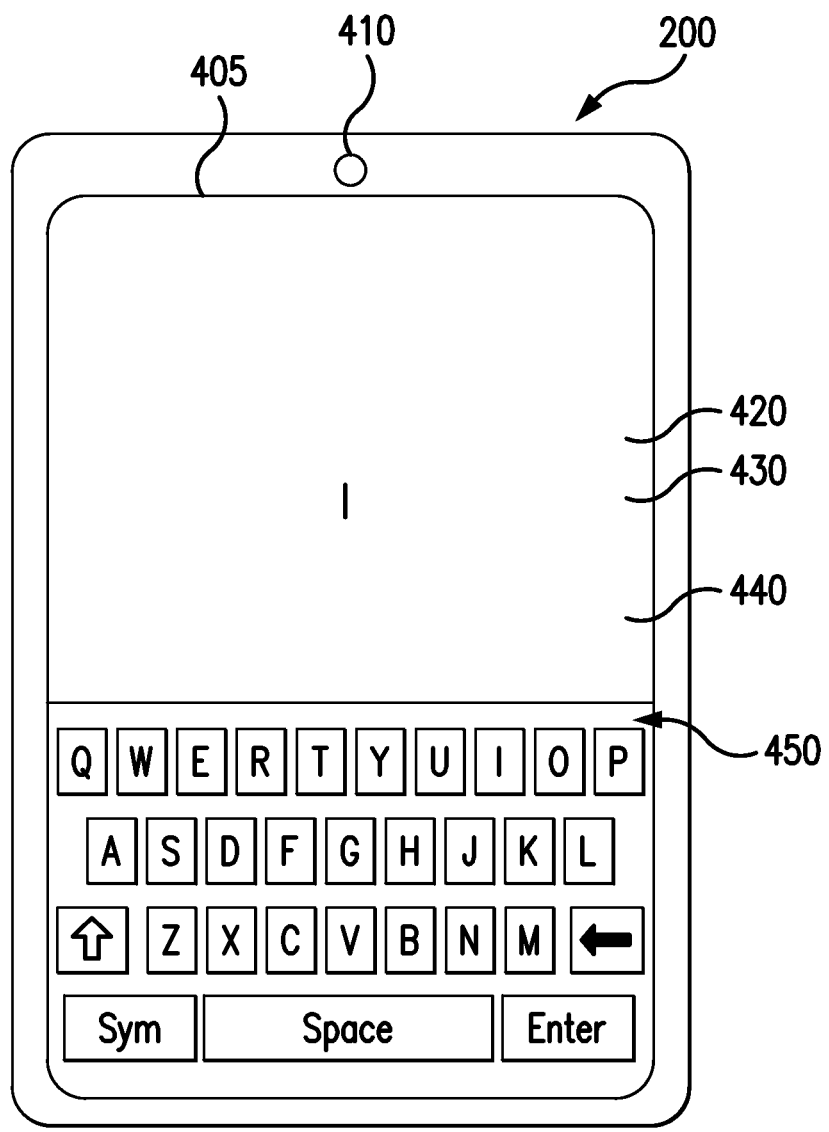
FIG. 4 is a diagram illustrating an exemplary mobile client device for use with the disclosed subject matter.

FIG. 4 illustrates a mobile client device for use with the system. The mobile client device, for example and without limitation, can include a text message enabled mobile phones and/or a smartphone 200. The user can interact with the system via alphanumeric text messages, for example and without limitation using SMS messaging, or using a mobile software application configured to interact with the system. The system can utilize integrated geo-location sensors, if available, including GPS and WiFi-based geo-location services to receive location information of the user. The mobile client device can be used by the Reporting Party, for example and without limitation to request emergency response services, and can be used by First Responders to coordinate an emergency response as discussed herein.

For purpose of illustration and not limitation, and as embodied herein, interactions can be performed by touching the touch screen 405. However, other interactions can be performed using other forms of input. For example, a user interaction can be performed by pressing a stylus to a region of the screen, or by moving a pointer to a particular region of a screen, such as by using a mouse or other pointing device. Further, interactions can be performed directly, or can be performed remotely, for example by using a remote control. Such interactions can also be performed by a motion not directly making contact with device 200, or with any other device. In this manner, a motion can be captured by sensor 410, which can be an optical sensor or motion sensor, for example a video camera, and the motion can be determined by device 200 to be a user interaction.

Figure 5:
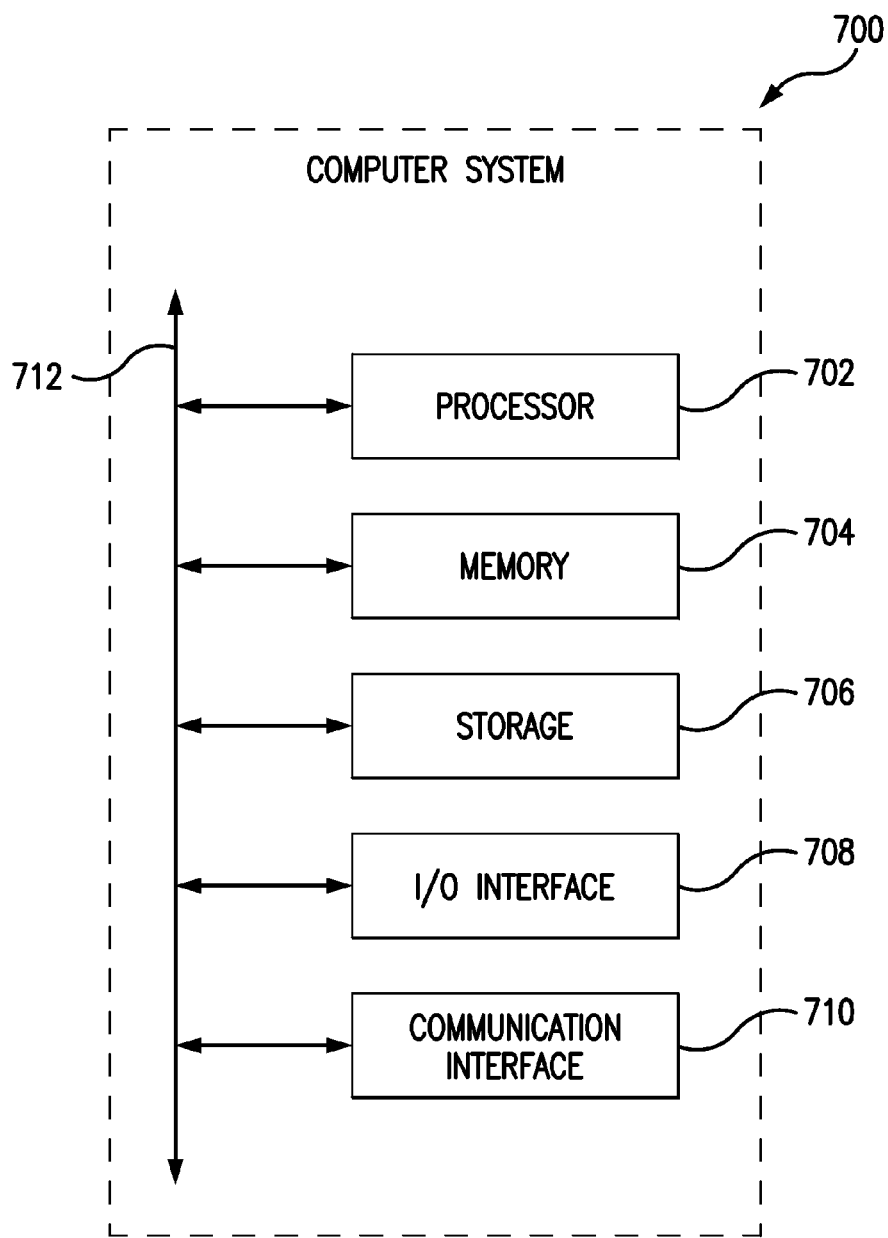
FIG. 5 is a diagram illustrating an exemplary system for implementing emergency response dispatch according to the disclosed subject matter.

FIG. 5 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple datacenters; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 02 to memory 704. Bus 712 may include one or more memory buses, as described below. In particular embodiments, one or more memory management units (MMUs) reside between processor 702 and memory 704 and facilitate accesses to memory 704 requested by processor 702. Although this disclosure describes and illustrates particular memory, this disclosure contemplates any suitable memory.

In particular embodiments, storage 706 includes mass storage for data or instructions. Storage 706 may include removable or non-removable (i.e., fixed) media, where appropriate. Storage 706 may be internal or external to computer system 700, where appropriate. In particular embodiments, storage 706 is non-volatile, solid-state memory. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 710 for it. Although this disclosure describes and illustrates a particular communication interface, this disclosure contemplates any suitable communication interface.

In particular embodiments, bus 712 includes hardware, software, or both coupling components of computer system 700 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code.

In addition to the specific embodiments disclosed above and/or claimed below, the disclosed subject matter is also directed to other embodiments having any other possible combination of the dependent features claimed below and those disclosed above. As such, the particular features disclosed herein can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A computerized method for coordinating decentralized response to emergency events, comprising:
   receiving at least one request for emergency assistance;
   sending an alert to mobile devices of registered responders in a geographic area corresponding to an emergency site of said request for emergency assistance;
   acknowledging a response from a mobile device of at least one responder of the registered responders indicating agreement to dispatch to the emergency site in response to the alert, the response including information regarding available resources of the at least one responder;

determining, using the information from the at least one responder, whether the available resources of the at least one responder includes a requested resource;

sending confirmation to the mobile device of the at least one responder to proceed to the emergency site if the available resources of the at least one responder includes the requested resource; and confirming a notification from the mobile device of the at least one responder indicating arrival of the at least one responder at the emergency site.

2. The method of claim 1, further comprising:

receiving a request for additional resources from the mobile device of the at least one responder, wherein the at least one responder comprises a designated responder;

sending a notification to a mobile device of at least one additional responder in the geographic area of the request for additional resources;

obtaining a response from the mobile device of the at least one additional responder indicating agreement to dispatch to the emergency site;

attaining confirmation from the mobile device of the at least one additional responder indicating arrival of the at least one additional responder at the emergency site;

obtaining confirmation from the mobile device of the designated responder indicating availability of emergency transportation from the emergency site to a destination facility;

receiving confirmation from the mobile device of the designated responder indicating arrival of the emergency transportation at the destination facility; and confirming availability of the designated responder.

3. The method of claim 2, further comprising providing a summary report of response times to the at least one responder.

4. The method of claim 1, further comprising:

determining a threshold number of the requested resource to respond to the at least one request; and allocating, using the information from the at least one responder, a number of the at least one responders not to exceed the threshold number of the requested resources.

5. The method of claim 1, wherein confirming arrival of said at least one responder comprises receiving updated location information of the emergency site from said at least one responder at the emergency site.

6. The method of claim 1, further comprising storing location information of the emergency site, and producing reports and statistics based on the location information.

7. The method of claim 1, further comprising recording and storing communications between reporting parties, responders, and receiving facilities for tracking.

8. The method of claim 1, further comprising determining a response time of the at least one responder and storing the at least one response time.

9. The method of claim 1, further comprising determining a suitable level of support for the request for emergency assistance.

10. The method of claim 9, further comprising canceling previously sent requests to responders when the suitable level of support has been confirmed.

11. The method of claim 1, wherein the response from the at least one responder includes a number of minutes for the at least one responder to arrive at the emergency site.

12. The method of claim 1, further comprising sending confirmation to the at least one responder to proceed to the emergency site if the response is received within a chute time limit.

13. The method of claim 1, wherein confirming arrival of said at least one responder comprises sending updated location information of the emergency site to the mobile device of the at least one responder if the at least one responder indicates the emergency site cannot be located.

14. The method of claim 1, further comprising sending an advance notification of the emergency transportation to the destination facility, the advance notice comprising a number of patients en route to the destination facility, a number of vehicles en route to the destination facility, or an estimated number of minutes for the emergency transportation to arrive at the destination facility.

15. The method of claim 1, wherein each of the registered responders in the geographic area is alerted simultaneously.

16. A computer system for coordinating decentralized response to emergency events, comprising:

one or more memories; and one or more processors coupled to the one or more memories, wherein the processors are configured to:

receive a message including at least one request for emergency assistance;

send an alert to mobile devices of registered responders in a geographic area corresponding to an emergency site of said request for emergency assistance;

acknowledge a response from a mobile device of at least one responder of the registered responders indicating agreement to dispatch to the emergency site in response to the alert, the response including information regarding available resources of the at least one responder;

determine, using the information from the at least one responder, whether the available resources of the at least one responder includes a requested resource;

send confirmation to the mobile device of the at least one responder to proceed to the emergency site if the available resources of the at least one responder includes the requested resource; and confirm a notification from the mobile device of the at least one responder indicating arrival of the at least one responder at the emergency site.

17. The system of claim 16, wherein the one or more processors are further configured to:

receive a request for additional resources from the mobile device of the at least one responder, wherein the at least one responder comprises a designated responder;

send a notification to a mobile device of at least one additional responder in the geographic area of the request for additional resources;

obtain a response from the mobile device of the at least one additional responder indicating agreement to dispatch to the emergency site;

attain confirmation from the mobile device of the at least one additional responder indicating arrival of the at least one additional responder at the emergency site;

obtain confirmation from the mobile device of the designated responder indicating availability of emergency transportation from the emergency site to a destination facility;

receive confirmation from the mobile device of the designated responder indicating arrival of the emergency transportation at the destination facility; and confirm availability of the designated responder.

18. The system of claim 17, wherein the one or more processors are further configured to provide a summary report of response times to the at least one responder.

19. The system of claim 16, wherein the one or more processors are further configured to receive updated location information of the emergency site from said at least one responder at the emergency site.

20. The system of claim 16, wherein the one or more processors are further configured to store location information of the emergency site for tracking.

21. The system of claim 16, wherein the one or more processors are further configured to record and store communications between reporting parties, responders, and receiving facilities for tracking.

22. The system of claim 16, wherein the one or more processors are further configured to determine a response time of the at least one responder and store the at least one response time.

23. The system of claim 16, wherein the one or more processors are further configured to determine a suitable level of support for the request for emergency assistance.

24. The system of claim 23, wherein the one or more processors are further configured to cancel previously sent requests to responders when the suitable level of support has been confirmed.

25. The system of claim 23, wherein the one or more processors are further configured to receive requests input by an operator.

26. A computerized method for coordinating decentralized response to emergency events, comprising:
    receiving at least one request for emergency assistance;
    sending an alert to mobile devices of registered responders in a geographic area corresponding to an emergency site of said request for emergency assistance;
    acknowledging a response from a mobile device of at least one responder of the registered responders indicating agreement to dispatch to the emergency site in response to the alert;
    confirming an arrival message from the mobile device of the at least one responder indicating arrival of said at least one responder at the emergency site;
    obtaining a transportation confirmation message from the mobile device of the at least one responder indicating availability of emergency transportation from the emergency site to a destination facility; and
    receiving a destination confirmation message from the mobile device of the at least one responder indicating arrival of the emergency transportation at the destination facility.

* * * * *